March 21, 1933.  C. H. HILL ET AL  1,902,501
BUS BAR STRUCTURE
Filed June 16, 1932
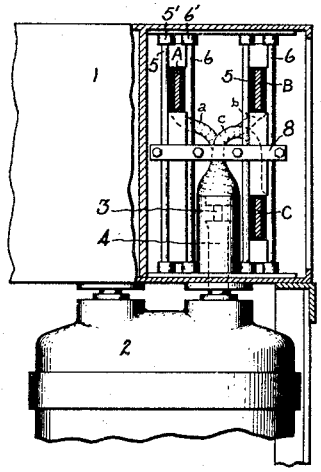
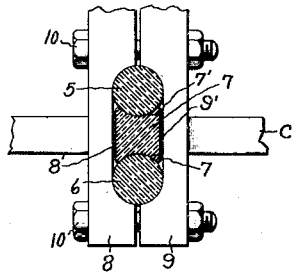
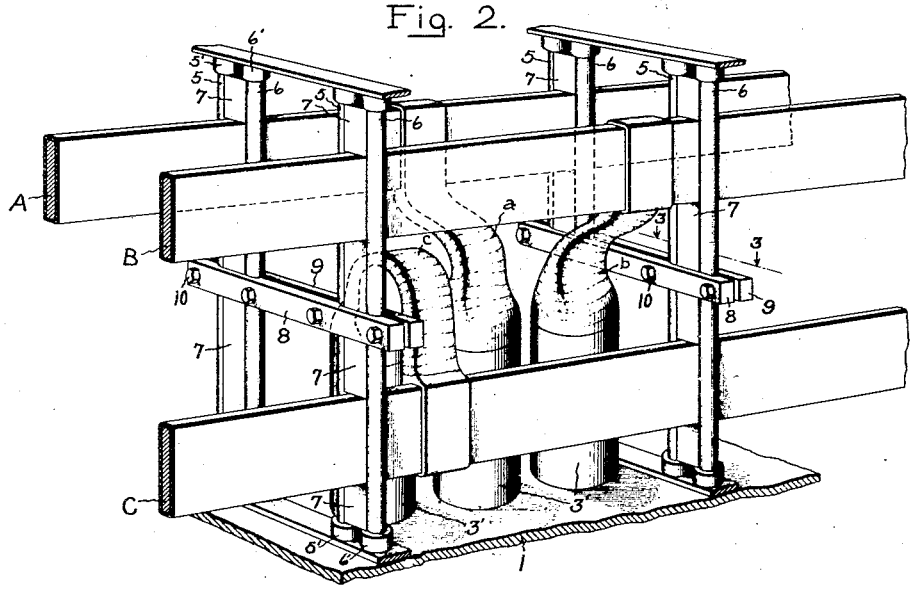
Inventors:
Charles H. Hill,
Nathan Swerdlow,
by Charles E. Mullen
Their Attorney.

Patented Mar. 21, 1933

1,902,501

UNITED STATES PATENT OFFICE

CHARLES H. HILL, OF DREXEL HILL, AND NATHAN SWERDLOW, OF PHILADELPHIA, PENNSYLVANIA, ASSIGNORS TO GENERAL ELECTRIC COMPANY, A CORPORATION OF NEW YORK

BUS BAR STRUCTURE

Application filed June 16, 1932. Serial No. 617,588.

Our invention relates to bus bar structure, more particularly to supporting and insulating structure for bus bars used in the metal enclosed type of switchgear.

The mounting and insulating structures for parallel polyphase bus bars carrying large currents involve a number of important design problems due to the great stresses which these structures are subjected to in the event of a short circuit on the buses. The large magnetic forces established by a short circuit tend to draw together or repel, depending on the direction of current in the respective circuit, the bus bars with the result that an individual bus bar may be slightly bent or flexed about its mounting. In case the bus bars are rigidly mounted with respect to a brittle insulating material, as porcelain or a similar ceramic material, fracture of the mounting or insulating structure may result. It will, of course, be apparent that strengthening of the bus bar mounting by metal may reduce the degree of insulation required for proper design.

The principal object of our invention is the provision of an improved mounting and insulating structure for parallel bus bars which shall afford a maximum degree of insulation for the bus bars and be simple and rugged in construction.

Our invention will be more fully set forth in the following description referring to the accompanying drawing, and the features of novelty which characterize our invention will be pointed out with particularity in the claims annexed to and forming a part of this specification.

Referring to the drawing, Fig. 1 is an elevational fragmentary end view, partly in section, of metal enclosed switchgear embodying our invention; Fig. 2 is an enlarged view in perspective of the bus bar structure shown in Fig. 1, and Fig. 3 is an enlarged cross sectional view taken along the line 3—3 of Fig. 2.

The metal enclosed switchgear shown by way of example in Fig. 1 comprises a plurality of parallel polyphase bus bars A, B and C housed within a bus bar compartment formed by a metallic casing 1 and arranged to be connected to a polyphase circuit breaker 2. The above arrangement is well known in the art, each phase bus bar being connected to its associated circuit through relatively movable disconnecting contacts 3 and 4 and the corresponding phase of the oil circuit breaker 2. Relative movement of the disconnecting contacts 3 and 4 is in the present case accomplished by vertical bodily movement of the circuit breaker 2 which carries the movable socket-type disconnecting contact 4.

Referring more particularly to Fig. 2, the phase bus bars A, B and C in the present instance are arranged generally in the form of a triangle so that the bus bars A and B are opposite and adjacent each other. It shall be understood of course that the bus bars may be arranged side by side, either horizontally or vertically. For the purpose of adequately insulating each of the phase bus bars and for mounting the same so that the mounting may withstand large lateral and other forces without damage, each bus bar is supported between a pair of strong insulating members 5 and 6 which are suitably secured at their opposite ends to the upper and lower walls of the casing. The insulating members 5 and 6 are preferably formed as rods composed of laminated wood or similar fibrous material constructed so as to have high mechanical strength. The means securing the laminated rods 5 and 6 at opposite ends may comprise cup-shaped members 5' and 6' welded to metallic casing 1 so as to form a rigid support for receiving the corresponding ends of the insulating rods.

The proper vertical spacing of each bus bar is assured by means of spacing members 7 of insulating material interposed between the rods 5 and 6 and having grooved edges corresponding to the coacting rods so that the spacers are locked in position. This arrangement is best shown in Fig. 3, the grooved edges 7' of the insulating spacers 7 closely conforming to the rods 5 and 6 so that the spacers may be moved only by separation of the rods. In the arrangement shown in Fig. 2, wherein the height of the bus bar compartment necessitates a supporting rod of a corresponding length, the rods are braced at their mid-sections by a pair of insulating members 8 and 9 suitably clamped together, as indicated in Fig. 3, as by bolts 10. The spacing members 8 and 9 are suitably recessed as at 8' and 9', so that the supporting rods and spacers are securely held with respect to lateral movement in any direction. Bracing of the insulating rods is facilitated by the present arrangement wherein the pairs of insulating rods for the individual bus bars are positioned oppositely so that bracing members 8 and 9 are common to each pair of rods. In order to conserve space the bus bar C is located beneath the bus bar B and is mounted between the same insulating rods, an insulating spacer 7 being interposed between the bus bars B and C in the manner above described. A bus bar section unit, as shown in Fig. 2, comprises at least two sets of supporting rods, each set being centrally braced as above described and spaced a suitable distance depending on the possible short circuit stresses and other factors.

The bus bars A, B and C are individually covered with a moulded insulating material and are connected by means of the taped connections $a$, $b$ and $c$ respectively to the fixed disconnecting contacts 3 as shown in Fig. 1. Insulating sleeves 3' extending through the lower wall of the bus bar compartment are open at their lower ends so as to receive the movable disconnecting contacts 4 which engage the stationary disconnecting contacts 3 mounted in the upper part of said sleeves.

In case of a severe short circuit it will be noted that the supporting points of the bus bars are firmly positioned with respect to lateral movement in any direction, the spacers insuring against vertical movement. However, any flexing of the bus bars between the points of support due to unusual forces merely results in rocking of the bus bar slightly about its point of support. In other words, the bus bars are not so rigidly mounted that a slight movement of the same would cause fracture of the mounting structure, although they are firmly positioned and effectively braced against short circuit forces of considerable magnitude. With this arrangement the bus bars have a maximum degree of insulation with respect to the metallic enclosing casing since metallic supporting and bracing structure is substantially eliminated.

It should be understood that our invention is not limited to specific details of construction and arrangement thereof herein illustrated, and that changes and modifications may occur to one skilled in the art without departing from the spirit of our invention.

What we claim as new and desire to secure by Letters Patent of the United States, is,—

1. Supporting and insulating structure for parallel bus bars comprising a plurality of pairs of rods of insulating material, the rods of each pair disposed on opposite sides of a bus bar for preventing lateral movement thereof, and insulating means common to and bracing pairs of said rods associated with different bus bars with respect to lateral movement.

2. Supporting and insulating structure for parallel bus bars comprising a plurality of pairs of laminated wood rods rigidly secured at their opposite ends, the rods of each pair engaging and disposed on opposite sides of a bus bar for preventing lateral movement thereof, and insulating means common to two pairs of said rods associated with different bus bars for bracing the mid-sections of the same with respect to lateral movement.

3. Bus bar supporting and insulating structure comprising a pair of rods of insulating material, said rods being rigidly secured at their opposite ends and spaced so as to engage opposite sides of a bus bar for preventing lateral movement thereof, and spacing means for said bus bar comprising insulating members disposed between said rods, the edges of said insulating member conforming to said rods so as to be locked in position by said rods.

4. Supporting and insulating structure for parallel bus bars comprising a pair of rods of insulating material for each of said bus bars, the rods of each pair being fixed at their opposite ends and spaced so as to extend along opposite sides of a bus bar for preventing lateral movement thereof, insulating spacers disposed between said rods for vertically spacing said bus bars, the edges of said spacers being grooved and coacting with said rods so as to be locked in position by said rods, and insulating means common to said pairs of rods rigidly clamping each pair of rods together and bracing said pairs with respect to each other.

5. Supporting and insulating structure for a unit section of parallel bus bars comprising two pairs of rods of insulating material for each bus bar section disposed longitudinally along said bus bar, the rods of each pair being fixed at their opposite ends and extending along opposite sides of said bus bar so as to prevent lateral movement thereof, the corresponding pairs of insulating rods of the other parallel bus bars being positioned so as to be substantially opposite said first-named pairs, and insulating members common to said oppositely disposed pairs of rods for bracing and clamping them with respect to each other at their mid-sections.

6. Supporting and insulating structure for parallel three-phase bus bars, said bus bars being arranged so that two bus bars are horizontally spaced and the third bus bar is vertically spaced from and substantially beneath one of said other bus bars, comprising a pair of vertically positioned insulating rods spaced so as to extend on opposite sides of the aforesaid vertically spaced bus bars, a second pair of vertically positioned insulating rods spaced so as to extend along opposite sides of said other bus bar, each of the aforesaid rods being fixed at their opposite ends, and bracing means common to said pairs of rods engaging the first-named pair of intermediate the bus bars associated therewith so that said bus bars are restrained against lateral movement.

7. Supporting and insulating structure for parallel bus bars arranged one above the other, comprising a pair of rods of insulating material fixed at their opposite ends and extending along opposite sides of said bus bars for preventing lateral movement thereof, insulating spacers disposed between said rods for vertically spacing said bus bars, said spacers arranged so as to be locked in position by said rods, and insulating means clamping said rods together and bracing the same intermediate said bus bars.

In witness whereof, we have hereunto set our hands.

CHARLES H. HILL.
NATHAN SWERDLOW.

CERTIFICATE OF CORRECTION.

Patent No. 1,902,501.             March 21, 1933.

CHARLES H. HILL, ET AL.

It is hereby certified that error appears in the printed specification of the above numbered patent requiring correction as follows: Page 1, line 14, for "circuit" read "circuits"; page 2, line 93, for "member" read "members"; page 3, line 10, claim 6, strike out the word "of"; and that the said Letters Patent should be read with these corrections therein that the same may conform to the record of the case in the Patent Office.

Signed and sealed this 16th day of May, A. D. 1933.

M. J. Moore.

(Seal)             Acting Commissioner of Patents.